Oct. 8, 1935.　　　　A. N. CRAMER　　　　2,016,362
MACHINE FOR FORMING HOLLOW GLASS ARTICLES
Filed May 26, 1934　　　6 Sheets-Sheet 1
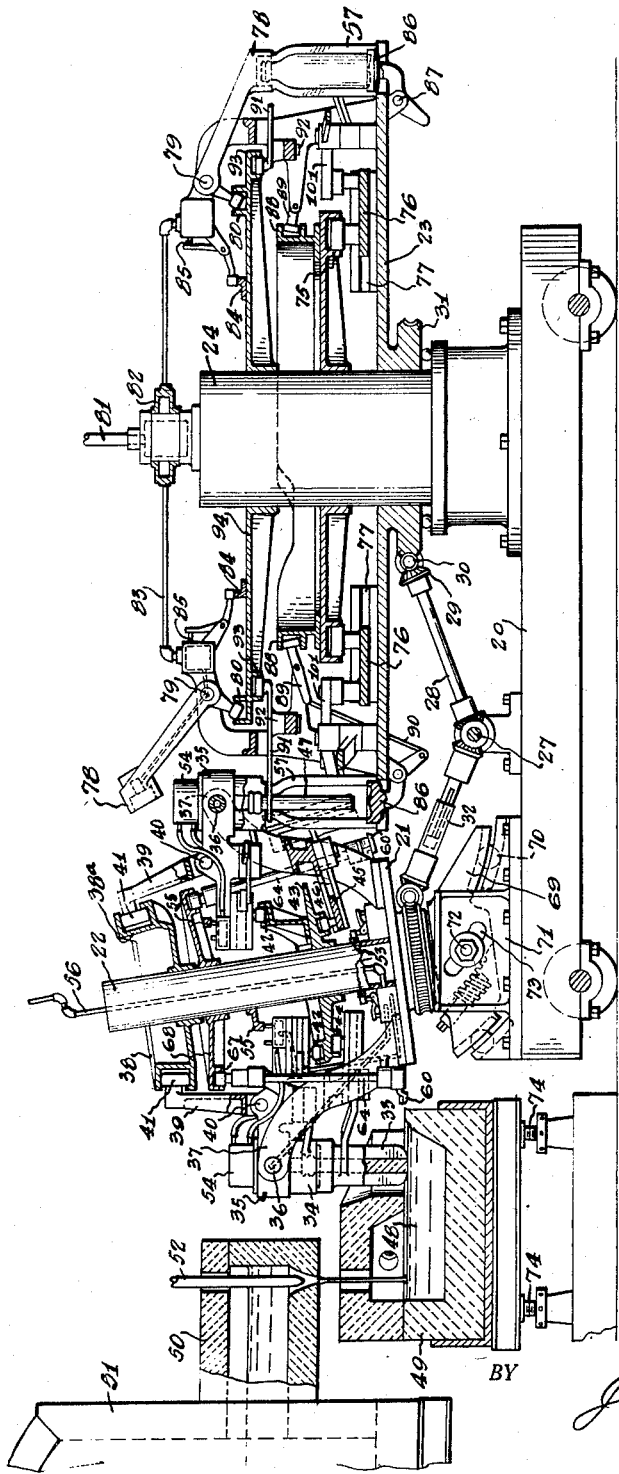
A. N. Cramer
INVENTOR.
BY
J. F. Rule
ATTORNEY.

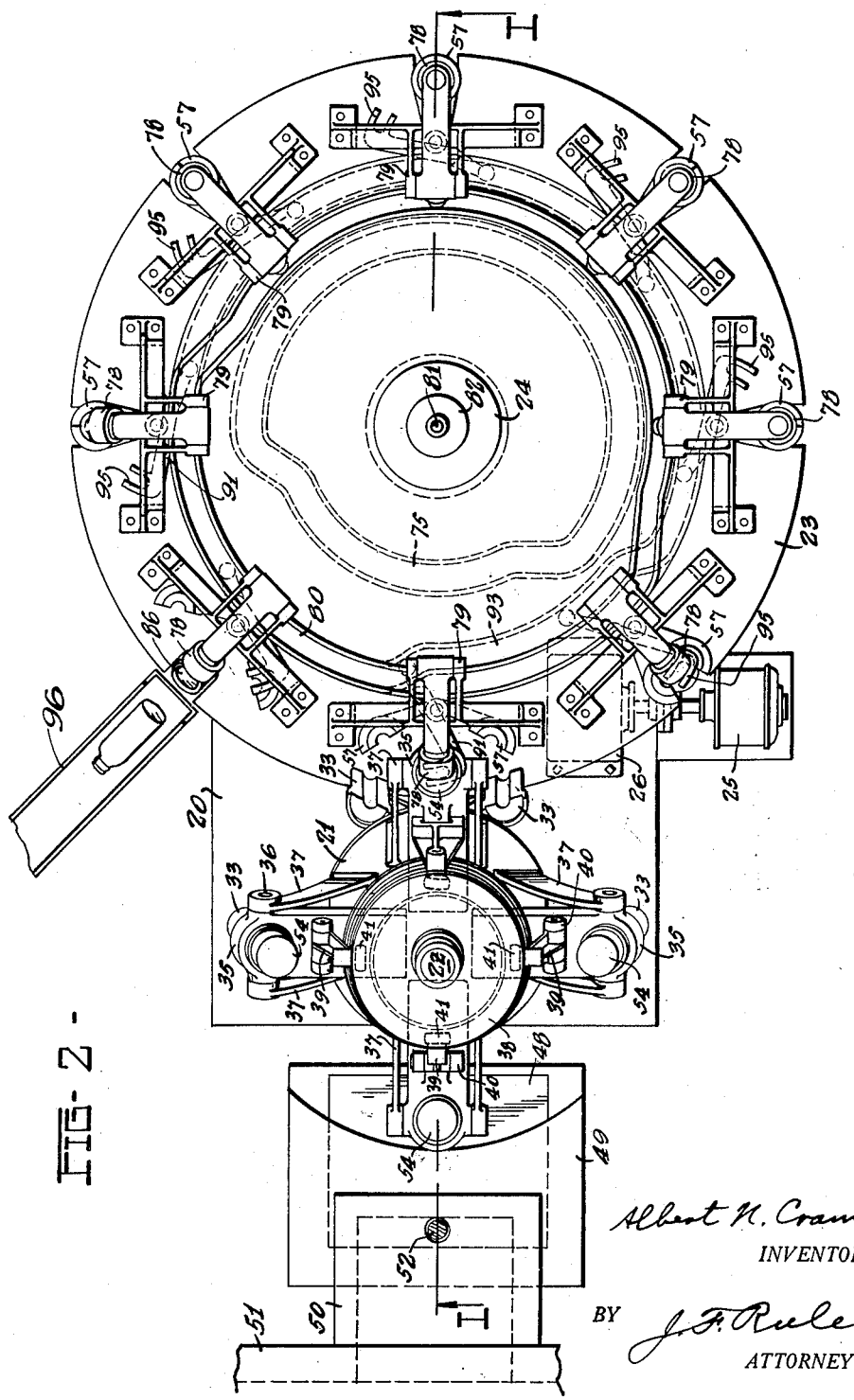

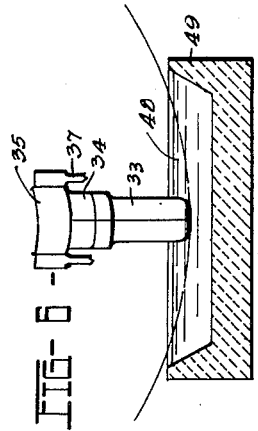
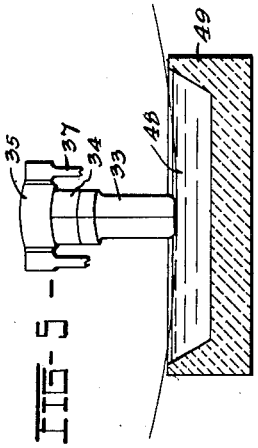
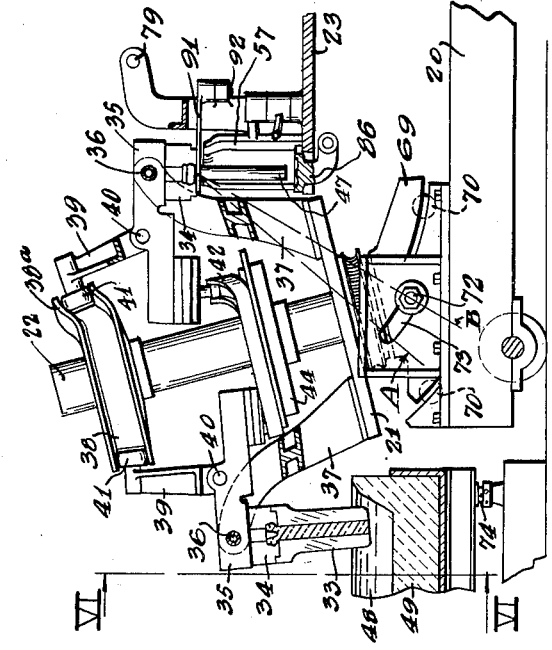
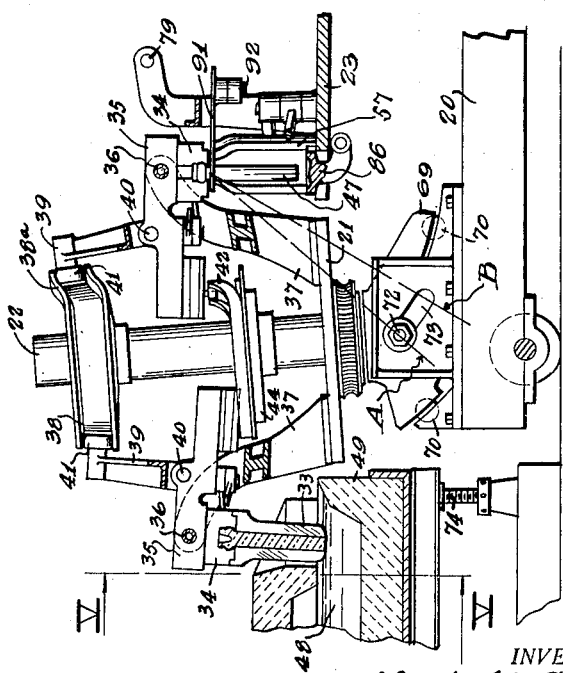

Oct. 8, 1935.  A. N. CRAMER  2,016,362
MACHINE FOR FORMING HOLLOW GLASS ARTICLES
Filed May 26, 1934  6 Sheets-Sheet 4
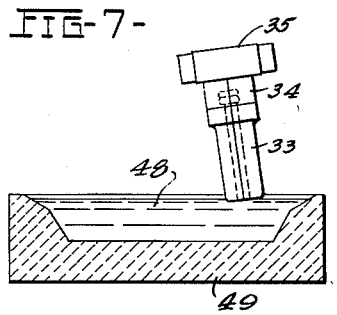
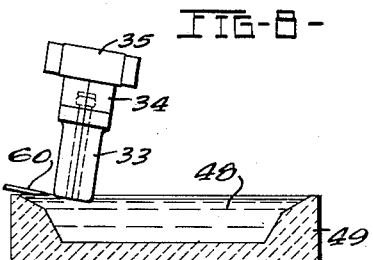
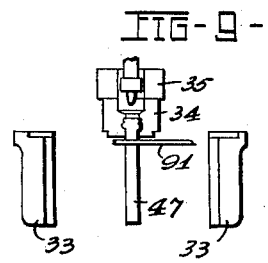
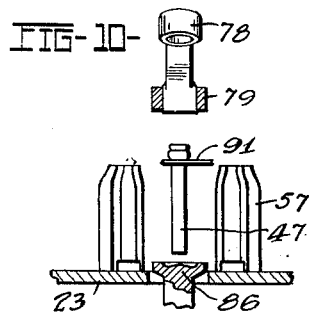
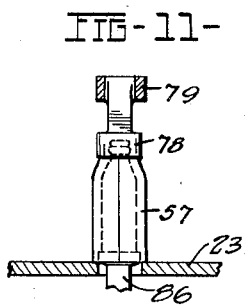
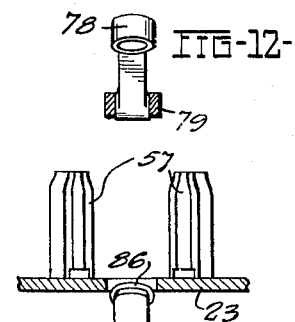
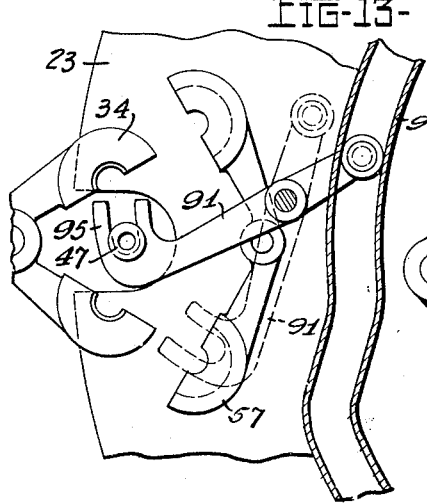
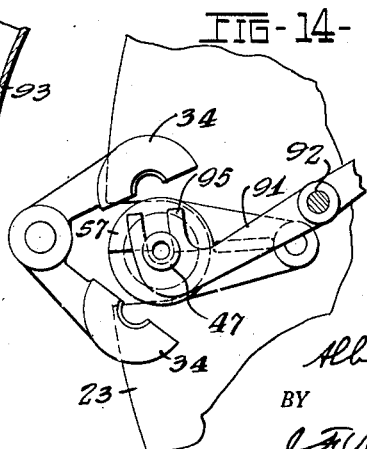
INVENTOR.
Albert N. Cramer
BY
J. F. Rule, ATTORNEY.

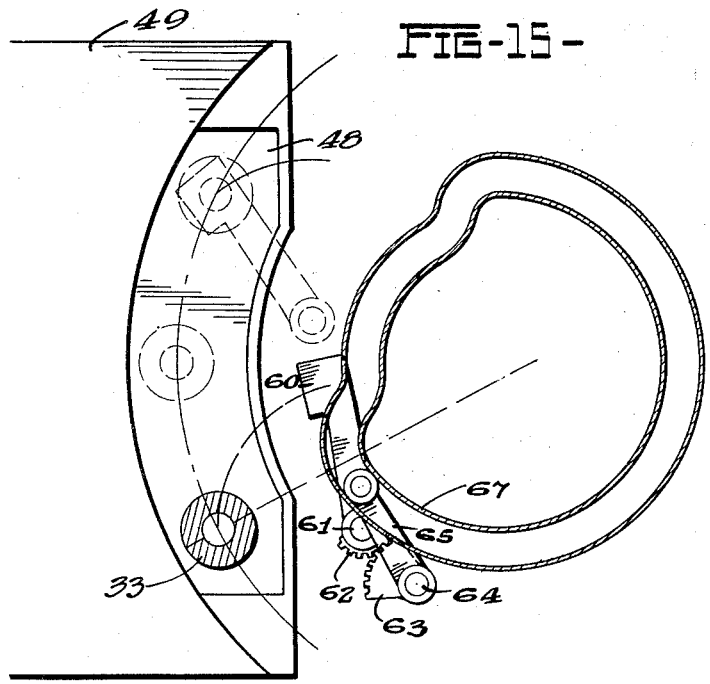
FIG-15-
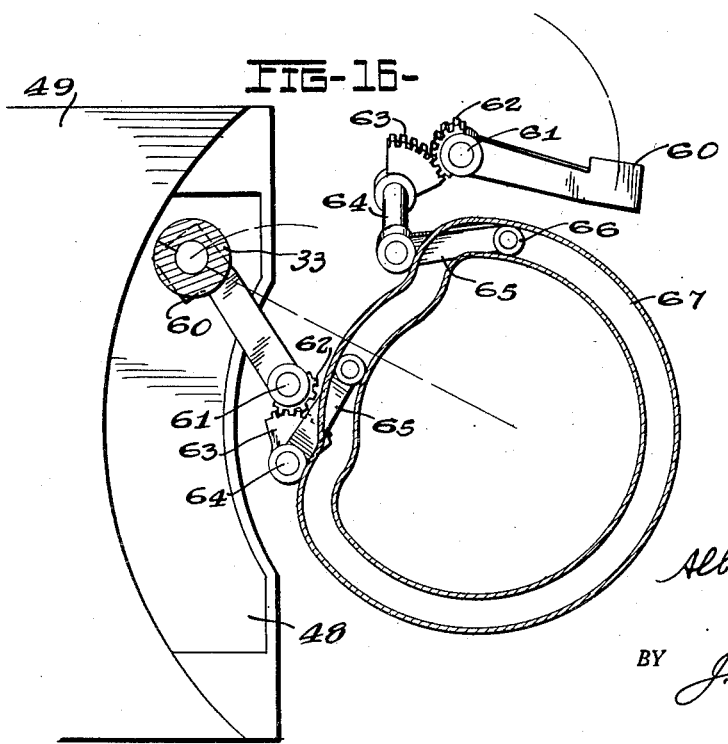
FIG-16-
Albert N. Cramer
INVENTOR.
BY J. F. Rule,
ATTORNEY.

Oct. 8, 1935. A. N. CRAMER 2,016,362
MACHINE FOR FORMING HOLLOW GLASS ARTICLES
Filed May 26, 1934 6 Sheets-Sheet 6
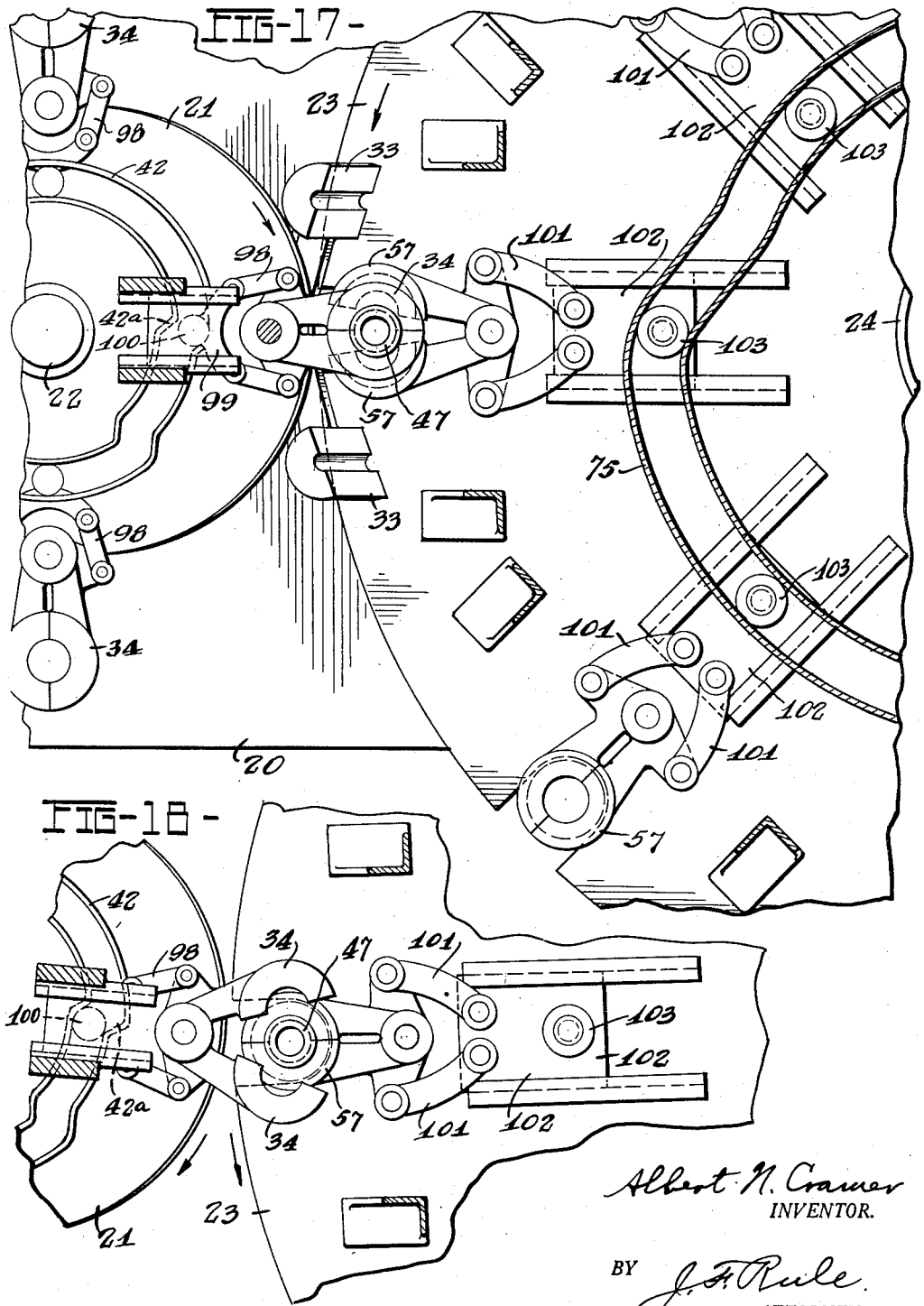

Patented Oct. 8, 1935

2,016,362

UNITED STATES PATENT OFFICE 2,016,362

MACHINE FOR FORMING HOLLOW GLASS ARTICLES

Albert N. Cramer, Toledo, Ohio, assignor, by mesne assignments, to Owens-Illinois Glass Company, Toledo, Ohio, a corporation of Ohio Application May 26, 1934, Serial No. 727,704

26 Claims. (Cl. 49—5)

My invention relates to machines for blowing hollow glassware such as bottles, jars and the like. The machine as illustrated is of the suction gathering type comprising a parison mold carriage and a finishing mold carriage mounted side by side for rotation about separate axes. The parison mold carriage has mounted thereon parison molds, each including a body blank mold and a neck mold which is in register therewith during the formation of a parison. The finishing mold carriage has thereon finishing molds to which the parisons are transferred and in which they are blown to finished form. More specifically, the invention relates to a type of machine in which the parison mold carriage is mounted to rotate about an axis inclined to the vertical, the arrangement permitting the blank molds to dip into a pool of molten glass and gather their charges of glass by suction without the need of lifting and lowering the blank molds on their carriage.

An object of the invention is to provide a machine of the type indicated in which the center column about which the parison mold carriage rotates is adjustable to different inclinations in a manner to adjustably vary the depth to which the blank mold dips into the pool for gathering its charge, and more particularly to provide means for adjustably varying the depth of dip without materially changing the period or length of time the mold is in dip.

A further object of the invention is to provide a construction permitting such adjustment of the depth of the dip without altering the transfer position or the height of the neck mold at the transfer point.

A further object of the invention is to provide a machine of the type indicated in which the neck mold and body blank mold are in register and their axes substantially vertical during the suction gathering operation, and in which the neck mold may be swung to a position in which its axis is vertical at the parison transfer point. The invention provides means for swinging the neck mold with the suspended parison to such vertical position after the inclined blank mold has opened, and a transfer arm to engage the parison and hold it while the neck mold opens, so that the bare parison is held vertical at the transfer position while the finishing mold closes thereabout. The neck mold plunger and the vacuum head through which suction is applied to the blank mold and by which the plunger is actuated, may also be mounted to swing with the neck mold.

A further object of the invention is to provide a novel transfer mechanism in which the bare parison is supported during the transfer, by a transfer arm separate from the molds, in a manner to permit a reheating of the parison while thus suspended prior to being enclosed in the finishing mold.

Other objects of the invention will appear hereinafter.

The present application discloses subject-matter also disclosed in my copending applications as follows:

Serial Number 565,563, filed Sept. 28, 1931, Machine for forming glass lens blanks, on which Patent No. 1,986,917 was granted January 8, 1935;

Serial Number 572,081, filed Oct. 30, 1931, Machine for forming glass bottles or similar blown glass articles, on which Patent No. 1,986,918 was granted January 8, 1935;

Serial Number 629,015, filed Aug. 16, 1932, Machine for making blown hollow glassware, on which Patent No. 1,986,919 was granted January 8, 1935.

Serial Number 701,108, filed Dec. 6, 1933, Machine for forming tumblers and other glass articles; and Serial Number 718,814, filed April 3, 1934, Machine for making tumblers.

Referring to the accompanying drawings:

Fig. 1 is a sectional elevation of the machine, the section being taken substantially at the center line of the mold carriages, as indicated by the line I—I on Fig. 2.

Fig. 2 is a plan view of the machine.

Fig. 3 is a part sectional elevation of the parison mold carriage and associated mechanism, certain parts being omitted for the sake of clearness, and the mold carriage being adjusted to a different inclination from that shown in Fig. 1.

Fig. 4 is a similar view showing another position of adjustment of the carriage.

Figs. 5 and 6 are sectional elevations showing a parison mold in dip, the views being taken at the lines V—V and VI—VI, respectively, on Figs. 3 and 4.

Figs. 7 to 12, inclusive, are partly diagrammatic views showing successive steps in the operation of gathering a charge of glass and forming it into a finished article. Fig. 7 shows the parison mold at the beginning of the gathering operation. Fig. 8 shows the parison mold at the completion of the gathering operation, just before the glass is severed. Fig. 9 shows the body blank mold opened and the bare parison suspended from the neck mold. Fig. 10 shows the parison supported by the transfer arm and the finishing mold open. Fig. 11 shows the parison enclosed in the finishing mold and the blowing head in position. Fig. 12 shows the finishing mold opened and the blown article being discharged.

Fig. 13 is a plan view of the molds and transfer arm during the transfer operation, the bare parison being supported by the transfer arm.

Fig. 14 is a view similar to Fig. 13, but showing the relative position of the parts after the finishing mold has closed.

Fig. 15 is a sectional plan view illustrating a knife and its operating mechanism, and the corresponding mold entering the glass.

Fig. 16 is a similar view with the parts in a more advanced position.

Figs. 17 and 18 illustrate a modified construction in which the parison transfer arm is omitted. Fig. 17 shows the parison supported in the neck mold while the finishing mold is being closed. Fig. 18 is a similar view, showing the finishing mold closed about the parison and the neck mold opened.

The machine is mounted on a wheeled base or platform 20 and includes a parison mold carriage 21 rotatable about a stationary column 22, and a finishing mold carriage 23 rotatable about a stationary column 24. The mold carriages are rotated in synchronism by an electric motor 25 (Fig. 2) having driving connections with a drive shaft 27 (Fig. 1), through speed reduction gearing contained within a gear box 26. The shaft 27 operates through a train of gearing including a shaft 28, gears 29, a worm 30 and a worm wheel 31, to rotate the finishing mold carriage 23. The parison mold carriage 21 is driven from the shaft 27 through a similar train of gearing which includes an extensible shaft 32 to permit adjustment of the column 22 as hereinafter described.

The mold carriage 21 has mounted thereon an annular series of mold groups with their operating mechanisms, each mold group comprising a body blank mold 33 and a neck mold 34 above and in register therewith, together forming a parison mold. The neck molds 34 are supported on carrier frames or arms 35, each connected by a pivot 36 to a bracket arm 37 extending upwardly and radially outward from the base of the mold carriage. Each carrier 35 has a rocking movement about the fulcrum 36 controlled by a stationary cam 38 mounted on the center column 22. An arm 39 connected by a pivot 40 to the arm 35, has a roll 41 running in the cam track 38. This construction permits the neck mold to be held with its axis substantially vertical while in glass gathering position and also at the transfer position, at the same time permitting the neck mold to travel about the inclined axis of the center column.

The neck molds and blank molds, as usual, are split, each comprising separable sections having faces which met in a vertical plane. The neck mold opening and closing movements are controlled by a cam track 42 on the upper side of a stationary cam plate 43 fixed to the column 22, the usual operating connections being provided between said cam track and the neck mold. The opening and closing movements of each blank mold 33 are controlled by a cam track 44 on the lower face of the cam plate 43. The operating connections between the cam track 44 and the blank mold comprise a slide block 45 running in guides 46, the latter having a fixed mounting on the supporting arms 37.

The blank mold 33 has its axis inclined to that of the column 22 at such an angle that the mold axis is substantially vertical when the mold is in dip for gathering its charge, as shown at the left (Fig. 1), the neck mold and body blank mold at this time being in register and their axes coinciding. As the mold carriage rotates about the inclined axis of the column 22, the parison mold swings from a vertical to an inclined position. As it approaches the transfer position between the mold carriages, the cam 44 operates to open the body mold 33, leaving the bare parison 47 suspended from the neck mold. As the mold 33 opens, an operating section 38ª of the cam track 38 operates to swing the inner end of the carrier arm 35 upward and thereby swings the neck mold about the pivot 36 to an upright position so that the suspended parison is vertical when the transfer position is reached.

The charges of glass are gathered by suction from a pool 48 of molten glass in a container 49, here shown as a stationary tank to which molten glass is continuously supplied from a forehearth 50 of a melting and refining tank 51, said forehearth having a bottom outlet through which the glass flows into the tank 49, under the control of an adjustable plug 52. The application of suction to the mold is controlled by a cam 53 (Fig. 1) near the base of the column 22, which cam operates a valve in a vacuum line leading to the usual vacuum head associated with the neck mold. The usual neck mold plunger for forming an initial blow opening in the neck end of the parison is lifted and lowered by a piston motor 54 under the control of a cam 55 which operates valves in the suction lines leading to the motor 54. A vacuum pipe 56 extending downward through the column 22 serves for exhausting the air as required to vacuumize the molds and to actuate the plunger motors 54.

Knives 60 (Figs. 1, 15 and 16) individual to the parison molds are operated to shear across the bottom of each mold and sever the glass as the mold moves out of dip. Each knife arm rocks about a pivot 61, said arm having a gear segment 62 which meshes with a gear segment 63 fixed to the lower end of a rock shaft 64, to the upper end of which is secured a rock arm 65 carrying a roll 66 running in a stationary cam track 67 formed on the lower face of a cam plate 68 fixed to the column 22. While the mold is in dip, its knife 60 is withdrawn, as shown in full lines (Fig. 15). As the mold moves out of dip, the knife is actuated by its cam (see Fig. 16), thereby severing the glass and forming a temporary closure for the bottom end of the mold. It will be noted that the cutting stroke of the knife is in a direction substantially opposite to the direction of movement of the molds which, as viewed in Fig. 15, are traveling in a clockwise direction. The knife moves toward the mold in a downwardly inclined direction (see Fig. 8), passing over the rim of the tank with the knife blade and its plane of movement, parallel with and in the plane of the lower end of the inclined mold or, in other words, in a plane perpendicular to the axis of the mold.

As above noted, the center column 22 is adjustable to different inclinations. The purpose of this is to adjustably vary the depth to which the gathering mold is dipped in the pool 48. To permit such adjustment, the column 22 has fixed thereto a base plate 69 supported on rolls 70 having bearings in a supporting frame 71. A locking bolt 72 which is connected to the column and extends through a slot 73 in the frame 71, permits the column to be locked in its adjusted position. The supporting surfaces or tracks on which the bearing rolls 70 run during the adjusting movement of the column 22 and the mold carriage thereon, are in concentric arcs of circles having radii A and B (Fig. 3), the center of the circles being substantially in the axis of the neck mold when the latter is at the transfer position. This transfer position is reached when the mold axis intersects the center line joining the axes of the columns 22 and 24. This center of said circles is also substantially in the plane of the lower face of the neck mold. The construction is such that the column 22 is adjustable about said center, the limits of adjustment being indicated by the radial lines A and B, and shown in Figs. 3 and 4, respectively. This construction permits adjustment of the inclination of the column 22 without raising or lowering the level of the neck mold at the transfer point or otherwise altering the transfer position, and therefore permits such adjustment without interfering with the cooperative relation of the neck mold, finishing mold and transfer arm during the parison transfer operation.

In the operation of the adjustable column there are two methods which may be used in actual practice. First, a changeable or adjustable throw cam section 38ᵃ, which may be adjusted to insure the parison being perpendicular at the transfer station irrespective of the angle of inclination of the central column, and, second, an equally practical construction, wherein the machine is designed for a definite angle of inclination of the central column, and any adjustment of this column would cause the parison to be delivered at the transfer station non-perpendicular to the same degree as the adjustment that had been made on the central column. Such slight deviation from the perpendicular would not affect the quality of ware being made.

Adjusting screws 74 are placed under the reservoir 49 for the molten glass, as there must be provided adjustment for the relative elevations of the pool of molten glass and the bottle machine. By such adjustment, the change of the inclination of the central column may be made to increase the depth of the dip without prolonging its arc. It is understood that this relative adjustment of elevation may be obtained either by adjusting the elevation of the machine or by adjusting the elevation of the glass container. Or it may be advisable to have both the machine and container adjustably mounted.

The finishing molds 57 are opened and closed by means of a stationary cam 75 on the center column 24, the usual operating connections being provided between the cam and the mold including a slide block 76 operating in guides 77 extending radially of the mold carriage. Blow heads 78 individual to the finishing molds are mounted to swing about pivots 79 under the control of a stationary cam 80. Air under pressure is supplied through a pipe 81 to a distributing head 82 from which air lines 83 extend to the blowing heads. A stationary cam 84 operates valves 85 individual to the blow heads for supplying air thereto. Associated with each finishing mold is a mold bottom 86 mounted to swing up and down about a fulcrum 87 under the control of a stationary cam 88 operating through levers 89 and links 90, the latter connected to the mold bottom arms.

The parison transfer mechanism includes transfer arms 91 individual to the finishing molds, each of said arms being mounted to swing horizontally about a pivot pin 92 on the finishing mold carriage, under the control of a stationary cam track 93 formed on the under face of a stationary cam plate 94 on the column 24. The free end of the transfer arm is bifurcated or formed with a fork 95 to straddle a parison and support it during the transfer. When a parison mold approaches the transfer point and the body blank mold is opened, as before noted, leaving the parison suspended from the neck mold,—the transfer arm 91 is swung outward toward the parison so that the fork 95 straddles the parison directly beneath the neck mold 34. The latter then opens, leaving the parison suspended by the arm 91 (Figs. 10 and 13). The mold bottom 86 now swings up (Fig. 10), the finishing mold closes around the parison, and the transfer arm is withdrawn, thus completing the transfer.

The blow head 78 then swings down onto the finishing mold, enclosing the neck end of the parison, and air pressure is applied to blow the parison to its finished form. The use of the transfer arm 91 permits substantially the entire parison to be exposed or left bare for a predetermined length of time during the transfer operations, thereby effecting a uniform reheating or heat distribution in the parison. After the final blowing operation and cooling of the blown article for a predetermined time within the finishing mold, the blowing head is withdrawn (see Fig. 12) and the finishing mold is opened, leaving the blown article supported on the bottom 86. The latter is then tilted under the control of its cam 88, thereby tilting the bottle and discharging it into a chute 96.

In actual operation it is not vital that the parison mold be exactly vertical during the gathering operation; nor that the glass parison be exactly vertical at the transfer station. The terms vertically and vertically disposed should be interpreted as including a position approximating the vertical, as in practice such position may deviate many degrees from the exact vertical.

Figs. 17 and 18 illustrate a modification in which the transfer arms 91 are omitted, the parison being supported by and under the direct control of the molds during the transfer. As here shown, the arms of each neck mold 34 are connected through links 98 to a slide block 99 carrying a cam roll 100 running on the track 42. The arms of each finishing mold are connected through links 101 to a slide block 102 carrying a cam roll 103 running in the cam track 75. The neck mold remains closed until the transfer point is reached, as shown in Fig. 17. The finishing molds 57 swing toward closed position as they approach the transfer point. When the Fig. 17 position is reached, the finishing mold is nearly closed. An operating section 42ᵃ of the cam 42 now operates to open the neck mold with a quick movement while the finishing mold completes its closing movement, thereby completing the transfer as shown in Fig. 18.

Modifications may be resorted to within the spirit and scope of my invention.

I claim:

1. A machine for forming hollow glass articles comprising, in combination, a blank mold, means for causing the blank mold to travel in a closed path parallel throughout with an inclined plane and with the axis of said mold maintained at a constant angle to said plane, a neck mold in register with the blank mold during a portion of said travel, means for opening the blank mold and leaving a parison supported in the neck mold, and means for swinging the neck mold to a different angle relative to said plane while the blank mold is open and thereby changing the angle of the parison supported in the neck mold.

2. A machine for forming hollow glass articles comprising, in combination, a blank mold, means for causing the blank mold to travel in a closed path parallel throughout with an inclined plane and with the axis of said mold maintained at a constant angle to said plane, a neck mold in register with the blank mold during a portion of said travel of the blank mold, means for opening the blank mold and leaving a parison supported in the neck mold, and means for swinging the neck mold and a parison supported therein to a vertical position while the blank mold is open.

3. In a machine for forming hollow glass articles, the combination of a mold carriage, means for rotating it about an axis inclined to the vertical, a blank mold thereon having its axis inclined at a constant angle to the axis of the mold carriage, a neck mold on the carriage in register with the blank mold, means for opening the blank mold and leaving a bare parison supported in the neck mold, and means for swinging the neck mold and thereby bringing the neck mold and parison to a substantially vertical position while the blank mold is open and its axis inclined to the vertical.

4. In a machine for forming hollow glass articles, the combination of a mold carriage, means for rotating it about an axis inclined to the vertical, a blank mold thereon having its axis inclined at a constant angle to the axis of the mold carriage, a neck mold on the carriage in register with the blank mold, means for opening the blank mold and leaving a bare parison supported in the neck mold, and means for swinging the neck mold and thereby bringing the neck mold and parison to a substantially vertical position while the blank mold is open and its axis inclined to the vertical, the inclination of the blank mold to the axis of the carriage being such that the blank mold is substantially vertical at one point in its rotation, the blank mold being open and the neck mold swung to said substantially vertical position when the blank mold is diametrically opposite said point.

5. A machine for forming glass articles comprising, in combination, a mold carriage, molds thereon, means for rotating the carriage about an axis inclined to the vertical, and adjusting means for adjusting the carriage and thereby bringing its axis to different inclinations.

6. A machine for forming glass articles comprising, in combination, a mold carriage, a stationary center column on which the carriage is mounted for rotation, adjusting means for adjusting the said column to different inclinations, and means for holding the column in its adjusted positions.

7. A machine for forming glass articles comprising, in combination, mold carriages arranged side by side, means for rotating one of the carriages about an axis inclined to the vertical, adjusting means to adjustably vary the inclination of said axis, means for rotating the other carriage about a vertical axis, blank molds on one said carriage, finishing molds on the other carriage, and means for transferring parisons from the blank molds to the finishing molds.

8. A machine for forming glass articles comprising a parison mold carriage, parison molds thereon, means for rotating said carriage about an axis inclined to the vertical, said parison molds having their axes so inclined to the axis of the mold carriage that when the molds are at their lowest position their axes are vertical, said parison molds each comprising a body blank mold and a neck mold in register therewith, means for opening the blank molds and leaving the parisons suspended from the neck molds while the blank molds are in an inclined position, and means for swinging the neck molds and parisons to vertical position.

9. The combination of a machine for forming glass articles, and a container for molten glass, said machine including a mold carriage, a mold thereon, a stationary column, means for rotating the carriage about the axis of said column, said column being positioned at one side of and inclined toward said container, the parts so arranged that the rotation of the mold carriage causes the mold to dip into the pool of glass in the container, and means for adjusting the inclination of said column and thereby adjustably varying the depth to which the mold dips in said pool.

10. The combination of a machine for forming glass articles, and a container for molten glass, said machine including a mold carriage, a mold thereon, a stationary column, means for rotating the carriage about the axis of said column, said column being positioned at one side of and inclined toward said container, the parts so arranged that the rotation of the mold carriage causes the mold to dip into the pool of glass in the container, the mold being at such an angle to said column that its axis is substantially vertical while the mold is over said pool, means for opening the mold, means on the carriage for supporting a parison formed in the mold, and means for swinging the parison support and thereby swinging the bare parison from an inclined to a vertical position while the mold is open.

11. The combination of a container for a pool of molten glass, a mold carriage, a stationary column positioned at one side of the container and inclined toward the container, a mold carriage mounted on said column, means for rotating the carriage about the inclined axis of the column, a blank mold on the carriage and brought by the rotation of the carriage to a charge gathering position over the pool of glass in the container, said mold having its axis maintained at a fixed angle to the axis of the mold carriage such that the mold is substantially vertical when in said charge gathering position, a parison support on the mold carriage, means for opening the blank mold and leaving a parison suspended in said support while at the opposite side of the center column from said container, and means for swinging said support on the mold carriage and thereby swinging the bare suspended parison to a vertical position.

12. The combination of a container for a pool of molten glass, a mold carriage at one side of the container, a stationary column on which the carriage is mounted for rotation, said column being inclined to the vertical, a parison mold on said carriage including a body blank mold open at its lower end to receive a charge of glass and a neck mold above and in register with the blank mold, said blank mold arranged to be brought by the rotation of the carriage, to a charge gathering position in which it is substantially vertical and its lower end in contact with the pool of glass in the container, the parison mold being brought by the rotation of the mold carriage to a transfer position at the opposite side of said column from the said container, means for opening the body blank mold and leaving a parison suspended from the neck mold as it approaches the transfer position, means for swinging the neck mold and thereby swinging the parison so that it is vertical at the transfer position, and means for adjusting said column to different inclinations and thereby adjusting the depth to which the mold dips into the pool.

13. The combination of a container for a pool of molten glass, a mold carriage at one side of the container, a stationary column on which the carriage is mounted for rotation, said column being inclined to the vertical, a parison mold on said carriage including a body blank mold open at its lower end to receive a charge of glass and a neck mold above and in register with the blank mold, said blank mold arranged to be brought by the rotation of the carriage, to a charge gathering position in which it is substantially vertical and its lower end in contact with the pool of glass in the container, the parison mold being brought by the rotation of the mold carriage to a transfer position at the opposite side of said column from the said container, means for opening the body blank mold and leaving a parison suspended from the neck mold as it approaches the transfer position, means for swinging the neck mold and thereby swinging the parison so that it is vertical at the transfer position, and means for adjusting the mold carriage and said column about a center located at the transfer position and substantially in the meeting plane of the neck mold and body blank mold, whereby the depth to which the body blank mold is dipped in the pool is adjustable without substantially changing the elevation of the neck mold at the transfer position.

14. The combination of a container for a pool of molten glass, a mold carriage at one side of the container, a stationary column on which the carriage is mounted for rotation, said column being inclined to the vertical, a parison mold on said carriage including a body blank mold open at its lower end to receive a charge of glass and a neck mold above and in register with the blank mold, said blank mold arranged to be brought by the rotation of the carriage, to a charge gathering position in which it is substantially vertical and its lower end in contact with the pool of glass in the container, the parison mold being brought by the rotation of the mold carriage to a transfer position at the opposite side of said column from the said container, means for opening the body blank mold and leaving a parison suspended from the neck mold as it approaches the transfer position, means for swinging the neck mold and thereby swinging the parison so that it is vertical at the transfer position, said means for swinging the neck mold comprising a carrier pivoted on the mold carriage and carrying the neck mold, a stationary cam track, and connecting means between the cam track and said carrier by which the latter is swung up and down about its pivot.

15. The combination of a container for a pool of molten glass, a mold carriage at one side of the container, a stationary column on which the carriage is mounted for rotation, said column being inclined to the vertical, a parison mold on said carriage including a body blank mold open at its lower end to receive a charge of glass and a neck mold above and in register with the blank mold, said blank mold arranged to be brought by the rotation of the carriage, to a charge gathering position in which it is substantially vertical and its lower end in contact with the pool of glass in the container, the parison mold being brought by the rotation of the mold carriage to a transfer position at the opposite side of said column from the said container, means for opening the body blank mold and leaving a parison suspended from the neck mold as it approaches the transfer position, means for swinging the neck mold and thereby swinging the parison so that it is vertical at the transfer position, a finishing mold carriage mounted at one side of the parison mold carriage, a finishing mold thereon, means for rotating the finishing mold carriage in synchronism with the rotation of the parison mold carriage, and means for closing the finishing mold about a parison at the transfer position.

16. The combination of a parison mold carriage and a finishing mold carriage arranged side by side, parison molds and finishing molds on said carriages respectively, a stationary inclined column on which the parison mold carriage is mounted, a vertical column on which the finishing mold carriage is mounted, means for rotating said carriages in synchronism about said columns, a container for molten glass positioned at the side of the parison mold carriage opposite from the finishing mold carriage, the parison molds being brought to a charge gathering position over said container by the rotation of their carriage, the parison molds having their axes inclined to said inclined column at such an angle that they are substantially vertical when in said gathering position, said parison molds each including a body blank mold and a neck mold above and in register therewith, means for opening the body blank mold and leaving a parison suspended from the neck mold, means for swinging the parison so that it is substantially vertical when it reaches a transfer position between the mold carriages, and means for closing a finishing mold about the parison.

17. The combination of a parison mold carriage and a finishing mold carriage arranged side by side, parison molds and finishing molds on said carriages respectively, a stationary inclined column on which the parison mold carriage is mounted, a vertical column on which the finishing mold carriage is mounted, means for rotating said carriages in synchronism about said columns, a container for molten glass positioned at the side of the parison mold carriage opposite from the finishing mold carriage, the parison molds being brought to a charge gathering position over said container by the rotation of their carriage, the parison molds having their axes inclined to said inclined column at such an angle that they are substantially vertical when in said gathering position, said parison molds each including a body blank mold and a neck mold above and in register therewith, means for opening the body blank mold and leaving a parison suspended from the neck mold, means for swinging the parison so that it is substantially vertical when it reaches a transfer position between the mold carriages, parison transfer mechanism including a supporting arm on the finishing mold carriage, means for swinging said arm into supporting engagement with the suspended parison, means for then opening the neck mold, leaving the bare parison supported in said arm, means for closing the finishing mold about the parison, and means for then withdrawing said arm from the parison.

18. The combination of a mold carriage, a mold thereon open at its lower end to receive a charge of glass, a container for a pool of molten glass, means for rotating the mold carriage about a stationary axis inclined to the vertical and thereby causing the mold to travel in an arc over the pool of glass with said lower end in dip, and means for adjusting the carriage and thereby adjustably varying the depth to which the mold dips in the glass.

19. The combination of a mold carriage, a mold thereon open at its lower end to receive a charge of glass, a container for a pool of molten glass, means for rotating the mold carriage about a stationary axis inclined to the vertical and thereby causing the mold to travel in an arc over the pool of glass with said lower end in dip, and adjusting means for adjustably varying the inclination of said axis and thereby varying the depth to which the mold dips in the glass.

20. The combination of a mold carriage, means for rotating it about an axis, a neck mold, a body blank mold supported on the carriage beneath and in register with the neck mold, a support on which the neck mold is carried, said support mounted on the mold carriage to swing about a horizontally disposed pivot above the blank mold, a stationary cam, operating connections between said cam and support, and means for opening the blank mold, leaving a parison supported in the neck mold, said cam operable to swing the neck mold and parison about said pivot.

21. The combination with a container for a pool of molten glass, of a mold table adjacent said pool, a mold upon said table open at its lower end to receive a charge of glass, a stationary inclined column, means to cause said table to rotate about said column with its axis of rotation coincident with the axis of said column, and thereby bring the open end of said mold into dipping position with said pool of glass, and means for adjusting the relative elevations of said pool and said table whereby the period of dip of said mold may be altered.

22. The combination with a container for a pool of molten glass, of a mold, means for moving the mold in a closed path of predetermined shape and thereby causing the mold to periodically dip into the pool and travel therethrough, and means for adjusting the position of said path relative to the pool while maintaining said predetermined shape of the path, in a manner to vary the depth to which the mold dips in the pool and the distance it travels in dip.

23. The combination with a container for a pool of molten glass, of a mold carriage, a mold thereon, means for driving said carriage and causing the mold to travel in a closed path of predetermined shape, said path being so positioned relative to the container and pool of glass therein that the mold is caused to dip into the pool and travel a predetermined distance in contact with the pool, and means for effecting a relative adjustment of said container and mold carriage while maintaining said predetermined shape of the path, and by such adjustments varying the depth to which the mold dips in the glass and the distance through which it travels in the glass.

24. The combination of a mold carriage, a mold thereon, means for rotating the carriage about a stationary inclined axis, a container for a pool of molten glass so positioned that the mold by said rotation of the carriage is moved periodically over the pool and caused to dip into the pool, and means for adjusting the inclination of said axis and thereby adjustably varying the depth to which the mold dips in the pool and the distance through which it travels therein.

25. The combination of a mold carriage, a mold thereon, means for rotating the carriage about a stationary inclined axis, a container for a pool of molten glass so positioned that the mold by said rotation of the carriage, is moved periodically over the pool and caused to dip into the pool, means for adjusting the inclination of said axis and thereby adjustably varying the depth to which the mold dips in the pool and the distance through which it travels therein, and separate means for effecting a relative up and down adjustment of the mold carriage and said container.

26. The combination of a container for a pool of molten glass, a suction gathering mold open at its lower end to receive a charge of glass, means for actuating the mold and causing said end to dip into the glass for gathering a charge and for moving the mold in an upwardly inclined direction out of the glass, a knife, and means for moving the knife in a downwardly inclined direction opposite to the movement of the mold as the latter moves out of dip and thereby causing the knife to shear across the bottom of the mold.

ALBERT N. CRAMER.